(12) United States Patent
Rademann

(10) Patent No.: US 11,286,834 B2
(45) Date of Patent: Mar. 29, 2022

(54) METHOD FOR CALIBRATING A UWS QUALITY SENSOR

(71) Applicant: Robert Bosch GmbH, Stuttgart (DE)

(72) Inventor: Sascha Rademann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 16/441,135

(22) Filed: Jun. 14, 2019

(65) Prior Publication Data

US 2019/0383196 A1 Dec. 19, 2019

(30) Foreign Application Priority Data

Jun. 19, 2018 (DE) .................. 10 2018 209 860.3

(51) Int. Cl.
*G01N 3/10* (2006.01)
*F01N 11/00* (2006.01)

(52) U.S. Cl.
CPC .......... *F01N 11/00* (2013.01); *F01N 2610/02* (2013.01); *F01N 2610/1406* (2013.01); *F01N 2610/148* (2013.01); *F01N 2610/1426* (2013.01); *F01N 2610/1433* (2013.01); *F01N 2610/1466* (2013.01)

(58) Field of Classification Search
CPC ...... F01N 11/00; F01N 11/002; F01N 11/007; F01N 2610/02; F01N 2610/148; F01N 2610/1433; F01N 2610/1426; F01N 2610/1466; F01N 2610/00; F01N 3/208; F01N 3/2066; F01N 3/20; F01N 3/18; F01N 3/10
See application file for complete search history.

(56) References Cited

U.S. PATENT DOCUMENTS

| 2013/0186070 A1* | 7/2013 | Daiker ............... F01N 3/08 60/274 |
| 2017/0016792 A1* | 1/2017 | Shepherd ........... G01D 18/008 |
| 2020/0256230 A1* | 8/2020 | Yasuda ............... F01N 11/00 |

FOREIGN PATENT DOCUMENTS

DE 102014211010 A1 * 12/2015 ............ F01N 11/00

OTHER PUBLICATIONS

English translation of DE 102014211010 A1 (Year: 2014).*

* cited by examiner

*Primary Examiner* — Herbert K Roberts
*Assistant Examiner* — Fatemeh Esfandiari Nia
(74) *Attorney, Agent, or Firm* — Michael Best & Friedrich LLP

(57) ABSTRACT

The present invention relates to a method for calibrating a UWS quality sensor arranged in a motor vehicle. In the method, the calibration of the UWS quality sensor takes place in an installed situation of the UWS quality sensor in the UWS tank.

15 Claims, 5 Drawing Sheets

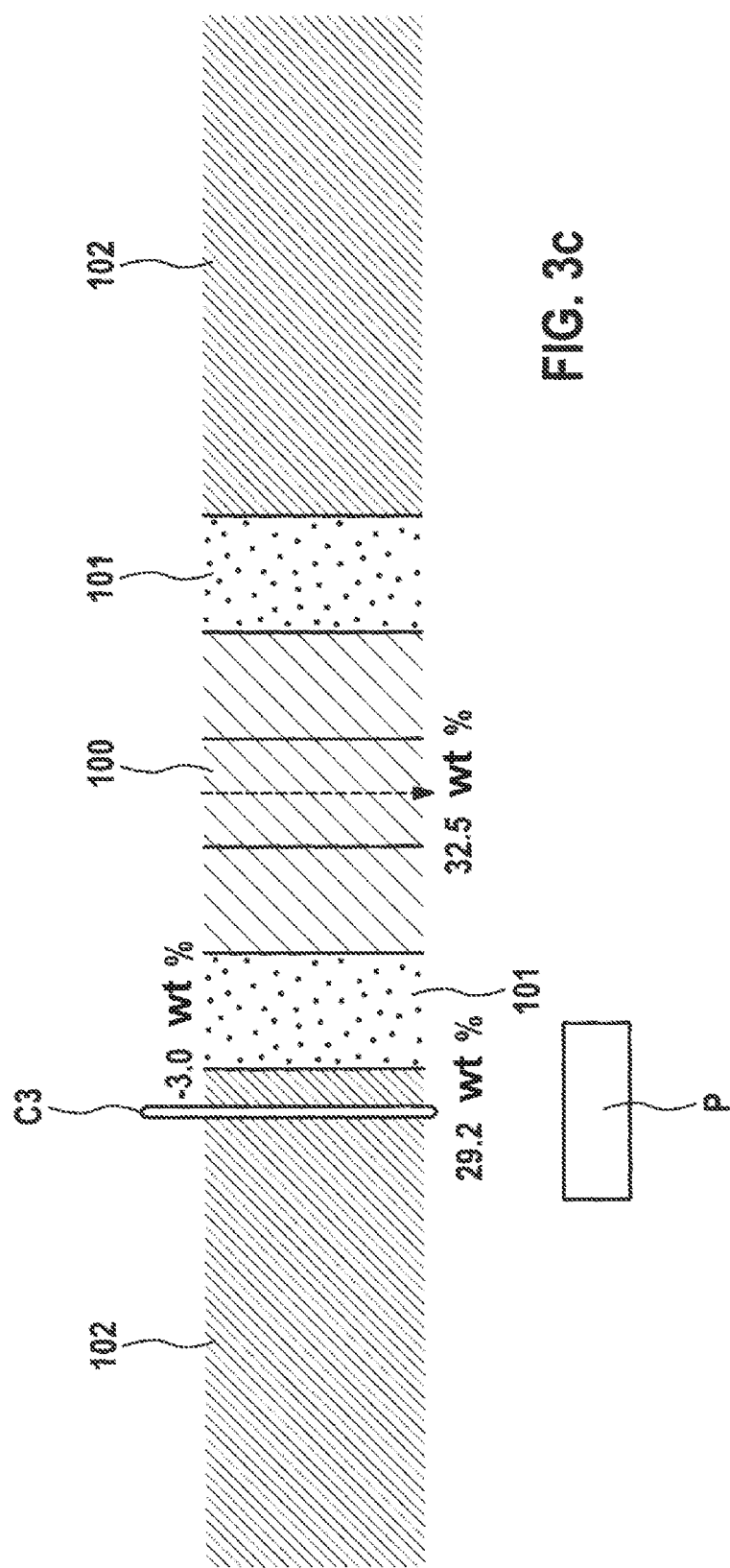

METHOD FOR CALIBRATING A UWS QUALITY SENSOR

BACKGROUND OF THE INVENTION

The invention relates to a method for calibrating a UWS quality sensor for a urea/water solution (UWS) which can be arranged in a UWS tank of a motor vehicle. Moreover, the present invention relates to a computer program which carries out all the steps of the method when it runs on a computing unit, and to a machine-readable storage medium which stores said computer program. Finally, the invention relates to an electronic control unit which is set up to carry out the method according to the invention.

SCR catalytic converter systems (SCR=Selective Catalytic Reduction) for nitrogen oxide reduction by means of metering in the urea/water solution (UWS) are known in the field of automotive technology. Future legislation in respect of emissions control requires monitoring of the quality of the UWS which is used by means of a UWS quality sensor, in order, in particular, to detect possible incorrect filling by way of the vehicle driver. The legal requirements for the accuracy of said quality monitoring correspond to a measuring accuracy of the sensor of ±1% mass fraction of urea in the UWS.

A known approach for said quality monitoring comprises ultrasonic sensors, by means of which the sound propagation time over a predefined distance is detected, and the urea content of the UWS is derived from the detected propagation time. This can be implemented in such a way that the ultrasonic sensor or transmitter and a sound reflector which is set up for this purpose are arranged in the medium at a defined spacing from one another, with the result that the different sound propagation times can be assigned to a medium density and, as a consequence of this, to a medium concentration. Said sensors are usually calibrated with a suitable UWS during manufacture. Owing to the high requirements for the measuring accuracy, a calibration is required in the case of the available sensors, which calibration influences the conversion rule and/or a characteristic diagram in such a way that the UWS concentration value is derived correctly from the measured value.

It is to be noted that said required measuring accuracy cannot be achieved with other less expensive sensors in the field of automotive technology under the given boundary conditions. It is to be taken into consideration in the case of a calibration that systematic influencing of the sensor accuracy by way of the geometric shape of the reservoir occurs as a result of the installation of the sensor, in particular as a result of thermal welding into the reservoir for the UWS. Therefore, different characteristics of the correction measures are to be provided in a manner which is dependent on the shape of the reservoir and/or the installed situation of the sensor or the sensor unit comprising a transmitter and a receiver.

Furthermore, it is to be emphasized that incorrect filling with UWS can lead via a corresponding sensor alarm not only to a warning or switch off of the SCR catalytic converter system, but rather to the automatic shutdown of the motor vehicle. A false alarm which has the same consequences should therefore be avoided in all circumstances.

SUMMARY OF THE INVENTION

The invention is based on the concept of carrying out a calibration of a UWS quality sensor which can be arranged or is arranged in a motor vehicle in an installed situation of the UWS quality sensor in the UWS tank. The UWS quality sensor can be integrated, in particular, into a supply module which is arranged in the UWS tank of the motor vehicle. In the installed situation, the UWS quality sensor or the supply module which receives it is fastened in the tank in the respective installed position. A calibration before the installation of the quality sensor in the tank is as a rule merely insufficiently feasible, since installation-induced length changes can occur as a result of the installation of the supply module or the quality sensor in the tank, which length changes influence the sensor behavior. In accordance with the invention, influences of the sensor accuracy which are brought about by way of the shape and embodiment of the UWS supply tank are determined, and are stored in a computing unit or electronic control unit in such a way that at least one correction measure which is adapted to this is retained for a respective UWS supply tank or a UWS supply tank shape. The correction measure for the UWS quality sensor can take place, in particular, in a manner which is dependent on the temperature of the UWS and/or the temperature of the tank as long as said temperatures exert an influence on the shape and/or the elastic properties of the UWS supply tank and, as a consequence, an influence on the UWS quality sensor which is connected to the supply tank, within the scope of operating limits. In particular, systematic influences on the UWS quality sensor can be corrected by way of said measure.

A concluding calibration of the quality sensor after the final installed position in the tank is reached takes place directly upon the initial start up of the system. The quality monitoring of the urea/water solution (UWS) in the tank can be ensured in the long term by means of said measures.

In one preferred refinement of the method, the calibration of the UWS quality sensor which is arranged in a motor vehicle is carried out in the case of an initial start up of the motor vehicle and/or after ensuring there has been no previous calibration of the UWS quality sensor. An initial start up comprises not only the first start of the vehicle, but rather can also comprise situations, in which a previously retrieved running performance of the vehicle lies below a threshold value, in particular below approximately 100 km.

A calibration in the case of the initial start up and in the case of a final installed situation of the quality sensor has the advantages that the system is capable of measuring here without additional complexity and no further production steps have to be carried out following the calibration, which further production steps might impair the calibration again. In addition, a change of the measured properties which is induced by way of the mounting of the quality sensor can be taken into consideration during the calibration. An additional calibration step which is associated with considerable costs is no longer necessary as a result. A step of this type might preferably be performed again when the quality sensor is replaced, for example within the context of a service measure.

In one preferred refinement of the method, the UWS quality sensor is detected, at least one feature of the UWS quality sensor being determined and being matched with a stored feature, a calibration of the UWS quality sensor being carried out only when the determined feature and the stored feature correspond or indicate the same UWS quality sensor. The feature can be the serial number of the quality sensor or another uniquely identifiable feature. Should it be detected as a result of the matching of the features that the quality sensor which is connected to the control unit is not that quality sensor, for which the calibration data are stored, a corresponding warning message can be output and/or the driver of the vehicle can be prompted to visit a repair shop immediately, in order to allow a corresponding recalibration of the quality sensor to be performed. Otherwise, it can also be determined within the context of sensor scanning of this type, in particular within the context of a self-test, whether there is a malfunction of the quality sensor and/or whether the latter is in a state, in which measured signals can be received and a calibration can be performed.

Expediently, after a start up of the vehicle, preferably after each start up of the vehicle, a check is carried out as to whether there is an initial start up of the motor vehicle. In the case of the detection of an initial start up of the motor vehicle and/or after ensuring that there has not been a preceding calibration of the UWS quality sensor, a measured value of the UWS quality sensor is detected. Subsequently, an adaptation of a conversion rule for said measured value into a UWS concentration takes place. Said adapted conversion rule is then stored permanently in an electronic control unit of the motor vehicle. As a result, a use of said conversion rule is possible even in the case of subsequent start ups of the motor vehicle.

It is also advantageous to fill a UWS tank of the motor vehicle with a urea/water solution of a predefined concentration before the initial start up of the motor vehicle, which concentration is taken into consideration during the adaptation of the conversion rule, since the properties and quality of the solution which is used are ensured by way of quality assurance measures with respect to the UWS supplier, as a result of which the conversion rule can be adapted in an improved manner and, as a result, the calibration of the sensor can be refined.

As an alternative, it is preferred to fill the UWS tank with a UWS before the initial start up of the vehicle, the concentration of which UWS is measured, and to take said measured concentration into consideration during the adaptation of the conversion rule. In this way, the concentration of the urea/water solution is determined very precisely and independently of manufacturing fluctuations, as a result of which an even more precise calibration of the UWS quality sensor is achieved.

Further preferably, for a calibration, a time period is waited after filling of the UWS tank with a urea/water solution and before a calibration, which time period is required to ensure a discharge of gas bubbles from the urea/water solution and/or to ensure thorough mixing of the urea/water solution and/or to ensure mechanical calming of the urea/water solution and/or to ensure a temperature equalization of the urea/water solution to the tank and its installed parts. Said step is preferably carried out after a determination of the identity of the quality sensor and before the actual calibration.

The above-described measures which can be used in an alternative or cumulative manner serve to establish an equilibrium state of the system with the aim of performing a measurement which is as reproducible as possible and, based on this, of performing a particularly lasting calibration of the quality sensor.

The adaptation of the conversion rule takes place, in particular, only when the measured value which is detected by the UWS quality sensor lies in a predefined value range. If the determined UWS concentration lies outside said value range, the calibration of the sensor is not permitted. In a case of this type, checking of the sensor and the UWS which is used for their specific properties can be considered, in order to avoid possible error chains during later operation.

Here, the value range is preferably selected in such a way that it corresponds to a concentration of the UWS in the range from 25% by weight to 40% by weight, preferably 35% by weight. As a result, possible incorrect calibrations as a consequence of a faulty quality sensor or pronounced quality fluctuations of the UWS can be prevented. If the value range is departed from, the possible fault sources can be checked, and the fault causes can be determined and pursued.

The computer program according to the invention makes it possible to implement the method according to the invention in an electronic control unit. To this end, it performs each step of the method according to the invention, in particular if it runs on a computer unit or electronic control unit. The machine-readable storage medium according to the invention stores the computer program according to the invention. By way of the computer program according to the invention being uploaded to an electronic control unit, the electronic control unit according to the invention is obtained which is set up to calibrate a UWS quality sensor by means of the method according to the invention.

The invention can be used, in particular, in conjunction with gasoline engines or diesel engines of motor vehicles which are equipped with an SCR exhaust gas aftertreatment system which has an abovementioned quality sensor for monitoring the UWS concentration. It goes without saying, however, that the method according to the invention can also be used in the case of corresponding internal combustion engines outside of automotive technology, for example in the field of marine technology or in the field of chemical engineering, with the advantages which are described herein.

Further advantages and refinements of the invention result from the description and the appended drawings.

It goes without saying that the features which are mentioned in the preceding text and are still to be described in the following text can be used not only in the respectively specified combination, but also in different combinations or on their own, without departing from the scope of the present invention.

BRIEF DESCRIPTION OF THE DRAWING

FIG. 3c shows yet another calibration example.

DETAILED DESCRIPTION

Figure 1:
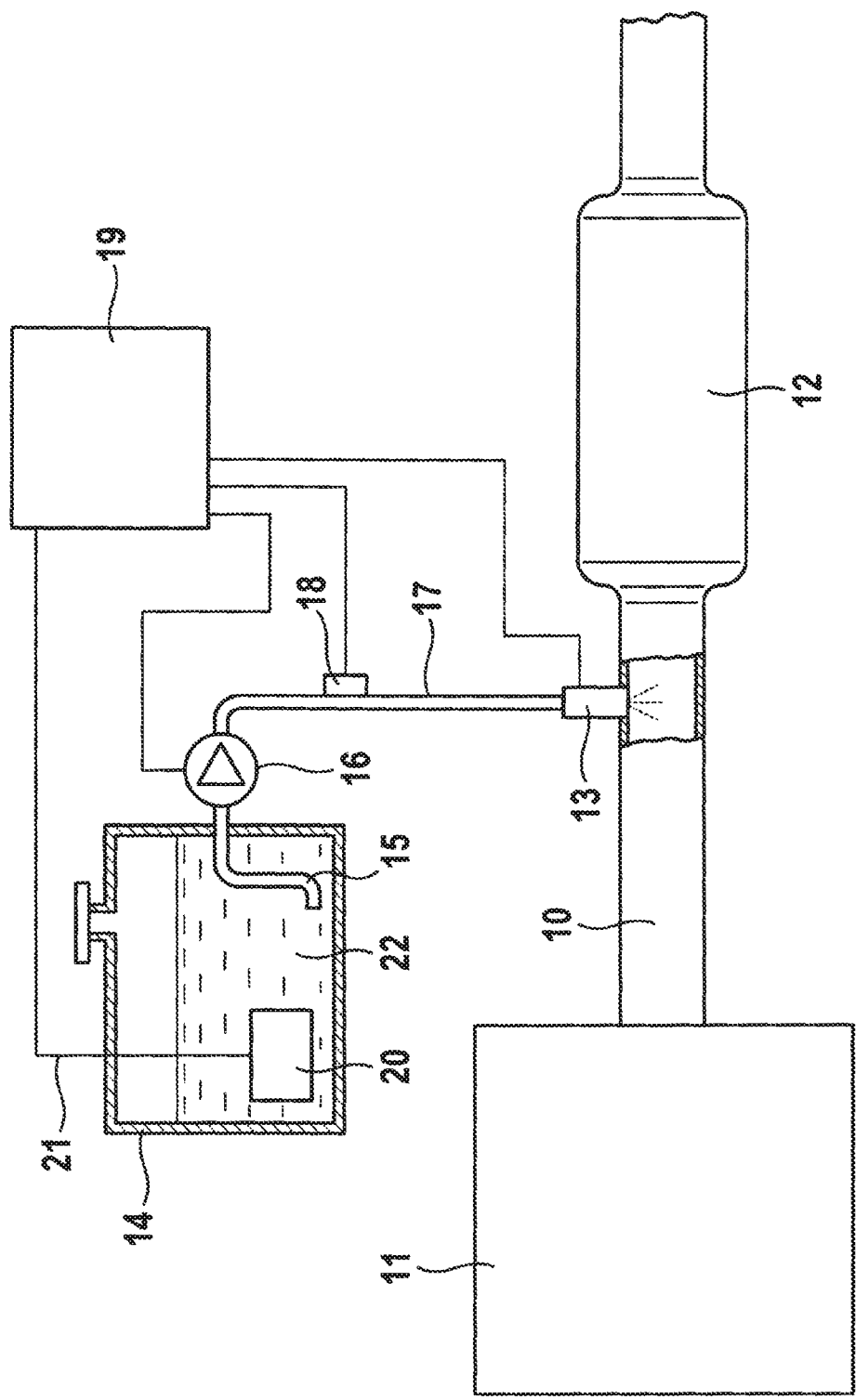
FIG. 1 diagrammatically shows a metering device of an SCR catalytic converter system having a UWS quality sensor of the relevant type here, in accordance with the prior art.

FIG. 1 shows a metering device of an SCR catalytic converter system for metering urea/water solution (UWS) into the exhaust gas section of an internal combustion engine 11 (merely indicated) of a motor vehicle. The SCR catalytic converter system serves in a manner known per se for the reduction of nitrogen oxides in the exhaust gas of the internal combustion engine 11 by means of selective catalytic reduction (SCR). For the reduction, the reducing agent UWS is injected via a metering valve 13 into the exhaust gas section 10 upstream of the SCR catalytic converter 12. The metering valve can also comprise one or more metering modules which comprise, for example, in each case a plurality of injection valves.

The UWS 22 is stored in a UWS tank 14. A suction line 15 is provided for the removal of the UWS 22, the UWS 22 being conveyed out of the UWS tank 14 via a delivery pump 16. The UWS 22 is injected precisely and in a requirement-dependent manner into the exhaust gas section 10. For this purpose, the pressure of the UWS 22 in the pressure line 17 is decisive, which pressure is therefore regulated to a predefined setpoint pressure. A pressure sensor 18 is provided for detecting the pressure in the pressure line 17, which pressure sensor 18 forwards the detected pressure signals to a control unit 19, with the result that the delivery pump 16 can adjust the predefinable setpoint pressure via signaling of the control unit 19.

The actuation of the metering valve 13 likewise takes place via signaling of the control unit 19. The metering valve 13 is actuated at what is known as an opening frequency which is identical for different metering quantities, but results in an opening of the valve of different length in the case of the different metering quantities. The opening frequency lies, for example, at 1 Hz.

A UWS quality sensor 20 which dips into the UWS 22 and by means of which the urea content of the UWS 22 is measured is arranged in the UWS tank 14. The measurement can take place in a manner known per se, for example by way of propagation time measurement of a sound signal. Within the context of the invention, however, the measurement technology which is used in the process is not important. The signal which is detected or generated by the quality sensor 20 is fed via a signal path 21 to the control unit 19 for further processing.

The method which is described in the following text is preferably carried out in the control unit 19 which is shown in FIG. 1. Since the location of the performance of the method is not important, however, the method can also be carried out in a separate control unit or an engine control unit for controlling the internal combustion engine 11.

Figure 2:
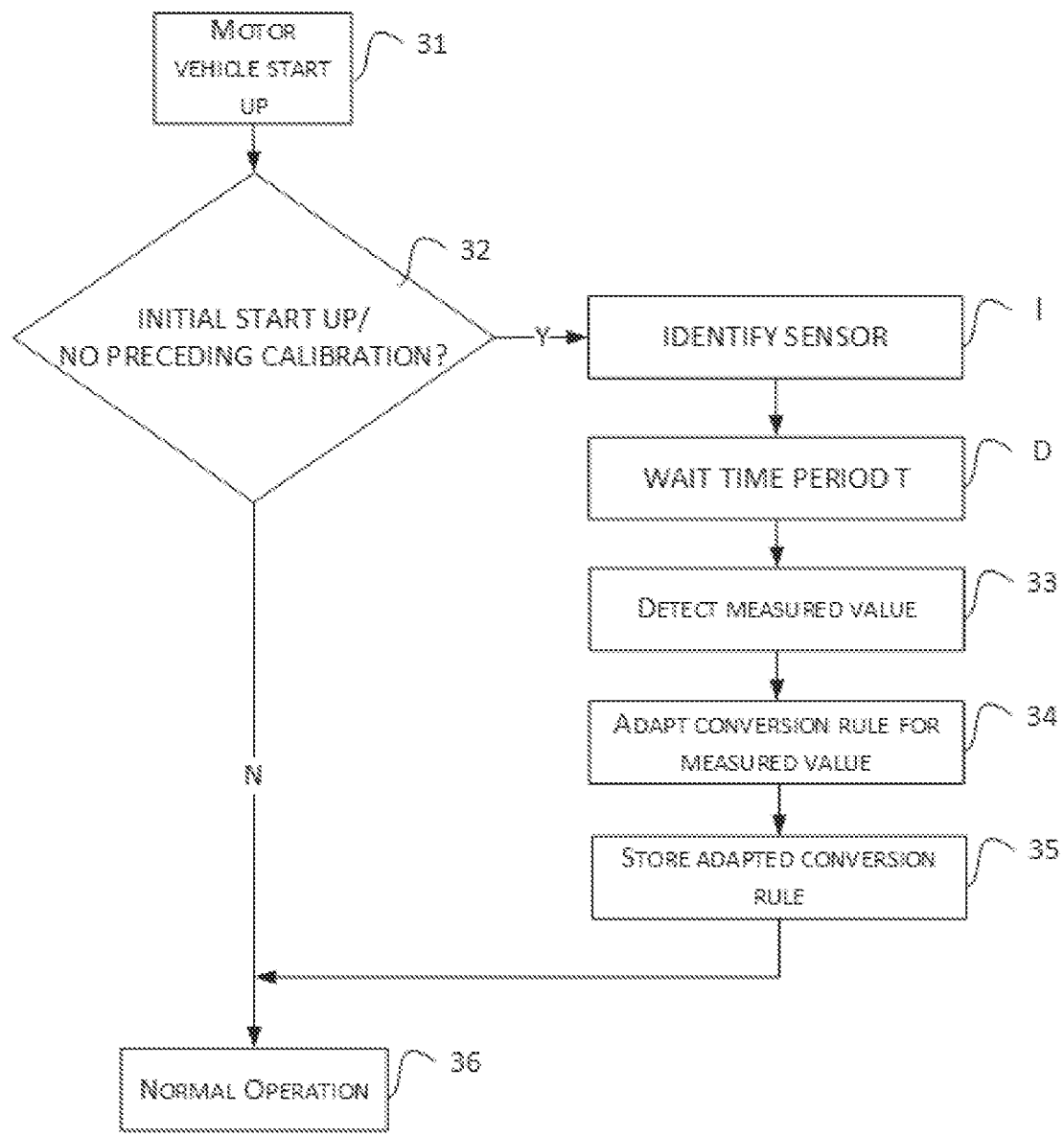
FIG. 2 shows one exemplary embodiment of the method according to the invention on the basis of a flow chart.

FIG. 2 shows a routine for calibrating the quality sensor. After the start up of the vehicle, preferably after each start up, in step 31, a check is first of all made in step 32 as to whether there is an initial start up of the motor vehicle. A check can also be made in an alternative or cumulative manner as to whether no preceding calibration of the UWS quality sensor 20 has already been performed. If this is not the case, a transition into the normal operation 36 of the motor vehicle takes place. If an initial start up and/or no preceding calibration of the UWS quality sensor 20 is detected, however, the measured values of the UWS quality sensor 20 are detected in step 33. On the basis of the measured values from step 33 and the UWS concentration which is already known in advance from the manufacturer specifications, a conversion rule for the conversion of the measured values into the corresponding UWS concentration is set up in step 34. In the case of the present method, for example, a urea/water solution which is available on the market under the commercial name "AdBlue®" is used, the concentration of which lies at approximately 32.5±0.7%. The conversion rule is stored permanently in the control unit 19 in step 35. The calibration of the sensor is concluded as a result. In the following step 36, normal operation, said stored calibration is used.

A step D and a step I can also take place before step 33. In step I, an identification of the quality sensor 20 takes place. This takes place, for example, via a retrieval of a serial number of the quality sensor 20 and comparison of said serial number with a stored serial number. If a quality sensor which is not stored is detected, the correction value or correction values which has/have been determined within the context of a preceding calibration for another quality sensor can be rejected. In addition, an indication can be output that a corresponding repair shop is to be visited, in order to perform a recalibration of the new quality sensor. The last-mentioned case comes into consideration, in particular, when a new sensor has been newly installed within the context of a service measure.

In step D, after filling of the UWS tank 14 with a urea/water solution 22 and before determining of the measured values of the quality sensor 20 in step 33, a time period T is waited which is required to ensure a discharge of gas bubbles from the urea/water solution 22 and/or to ensure thorough mixing of the urea/water solution 22 and/or to ensure mechanical calming of the urea/water solution 22 and/or to ensure a temperature equalization of the urea/water solution 22 to the tank and its installed parts. The last-mentioned measures are aimed, in particular, at providing an equilibrium state of the system which is as satisfactory as possible, which system is to be measured by means of the quality sensor. In particular, the above-mentioned variables, such as a reduced density of the urea/water solution as a result of the introduced gas bubbles and any temperature fluctuations and/or mechanical movements within the system, can have a disadvantageous influence on measurement by means of the quality sensor.

In accordance with the described exemplary embodiment of the method according to the invention, the conversion rule is generated in step 34 on the basis of the measured values from step 33 and the UWS concentration which is already known in advance from the manufacturer specifications. It can be provided in another exemplary embodiment of the invention to determine the used UWS concentration before filling of the UWS 22 into the UWS tank 24 by means of a suitable testing method, instead of relying on the manufacturer specifications.

Figure 3A:
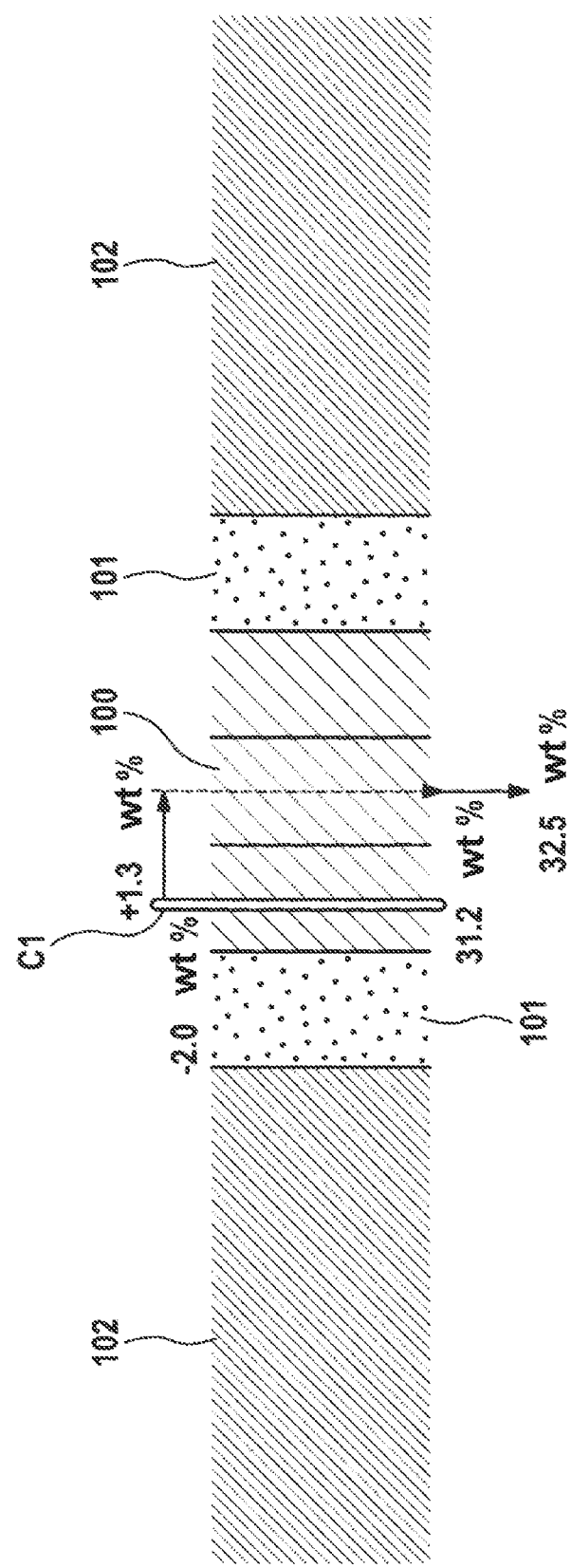
FIG. 3a shows a first calibration example.

FIGS. 3a) to c) show three different calibration examples. In the figures, three different tolerance ranges are specified by way of example, the dashed regions 100 reaching around the standard concentration of 32.5% by weight by up to ±2% by weight. Within said range, a complete compensation to the standard concentration is performed. The second range 101 (cf. FIG. 3b) adjoins the range 100 directly, merely a partial compensation being performed within said range.

The range 101 extends, for example, to the two sections between −4% by weight and −2% by weight below the standard concentration of 32.5% by weight, and to the upper section between +2% by weight and +4% by weight above the standard concentration of 32.5% by weight. In the third range 102 (cf. FIG. 3c) which adjoins the range 101 directly, the measured concentration of the urea/water solution UWS differs so greatly from the standard concentration that no calibration is performed. This can be possible when the tank is filled, for example, with an incorrect operating medium. Within the context of a determination of this type, for example, incorrect filling with an incorrect operating medium can be determined and a warning can possibly be output.

In FIG. 3a), the measured concentration C1 of 31.2% by weight in the urea/water solution UWS differs only slightly from the desired standard concentration of 32.5% by weight. In this case, on account of the slight deviation, a compensation is performed in such a way that a full remedy is carried out from the measured concentration of 31.2% by weight to the nominal concentration of 32.5% by weight and compensation to the latter is carried out. The additive correction value for said compensation of +1.3% by weight is used in conjunction with the measured value of the quality sensor of 31.2% by weight, in order to determine the standard concentration to be expected. The correction value is stored in a non-volatile manner in the control unit, and the calibration operation is concluded.

Figure 3B:
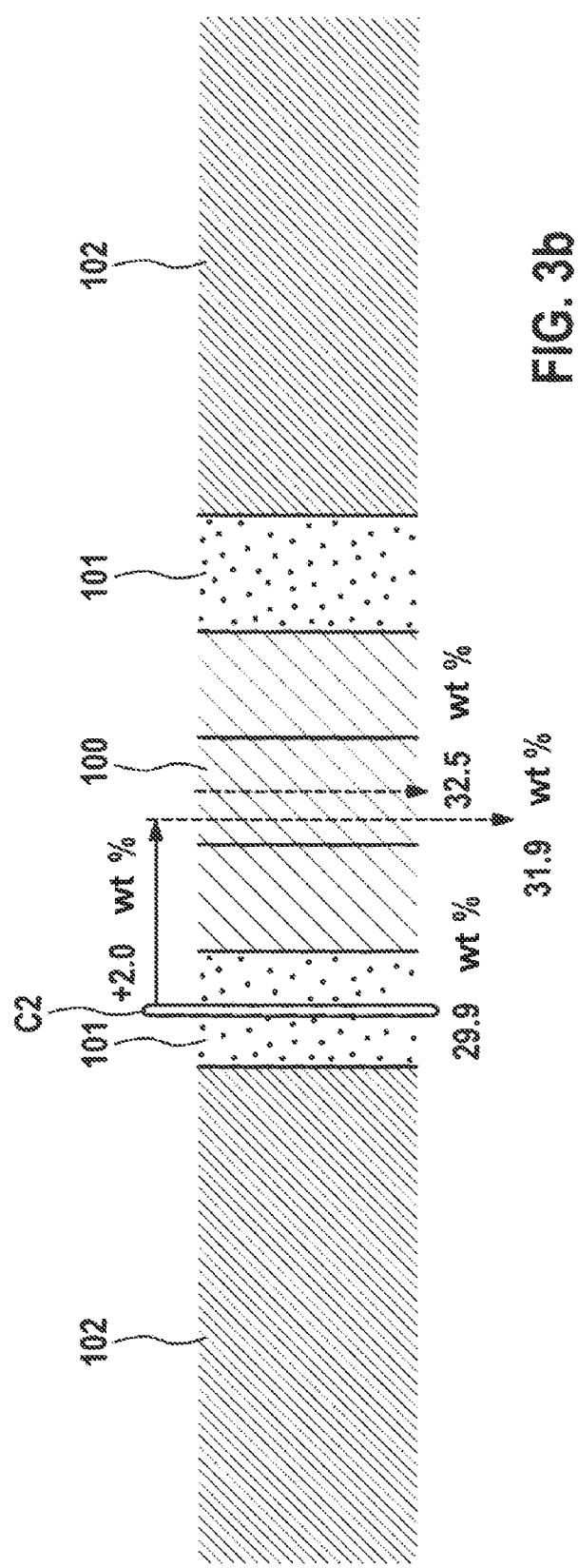
FIG. 3b shows a further calibration example.

In the case which is shown in FIG. 3b), the measured concentration of 29.9% by weight deviates to a greater extent from the standard concentration. Here, merely a partial compensation of the sensor deviation from the standard concentration of 32.5% by weight is performed. In this case, a permanent but reduced concentration deviation from the standard concentration remains in existence. The maximum additive correction value which is determined for said example of, for example, +2% by weight is used in conjunction with the measured value of the quality sensor of 29.9% by weight and leads to a corrected concentration of 31.9% by weight. The correction value is stored in a non-volatile manner in the control unit and the calibration operation is concluded. By way of this type of calibration, a further reduction of the sensor tolerance takes place and, at the same time, the overall range is extended, in which the adaptation is carried out.

In the case which is shown in FIG. 3c), the measured concentration of 28.2% by weight deviates to a considerable extent from the standard concentration. In this case, no compensation is performed and an error is detected. After a checking routine of the quality sensor 20 and the determination of its functional capability, incorrect filling with an incorrect operating medium can be deduced, in particular. For this case, a corresponding error code P can be output or can be stored in a corresponding system memory.

The invention claimed is:

1. A method for calibrating a UWS quality sensor (20) for a urea/water solution (UWS), which UWS quality sensor (20) is arranged in a UWS tank (14) of a motor vehicle, the method comprising:
   installing the UWS quality sensor (20) in the UWS tank (14);
   performing a check (32) as to whether there is an initial start up of the motor vehicle and whether the UWS quality sensor (20) was previously calibrated;
   determining a unique identifying feature of the UWS quality sensor (20) in the case of the initial start up being detected and no previous calibration of the UWS quality sensor (20) being detected;
   comparing the unique identifying feature with a stored feature; and performing an initial calibration of the UWS quality sensor (20) only when the unique identifying feature and the stored feature correspond or indicate the same UWS quality sensor (20)
   wherein the initial calibration of the UWS quality sensor (20) includes
   detecting a measured value of the UWS quality sensor (20),
   performing an adaptation (34) of a conversion rule for the measured value of the UWS quality sensor (20) into a UWS concentration only when a measured value of the UWS quality sensor (20) is detected (33), the measured value lying in a first predefined value range, and permanently storing (35) the adapted conversion rule in an electronic control unit (19) of the motor vehicle, and
   wherein a partial compensation of a deviation between the measured value of the UWS quality sensor and of a predetermined value in the adaptation (34) of the conversion rule is performed only when the measured value of the UWS quality sensor (20) is determined to lie in a second predefined value range outside of the first predefined value range.

2. The method according to claim 1, wherein the UWS tank (14) of the motor vehicle is filled with a urea/water solution (22) of a predefined concentration before the initial calibration of the UWS quality sensor (20), the known concentration being taken into consideration during the adaptation (34) of the conversion rule.

3. The method according to claim 2, wherein the value range corresponds to a concentration of the urea/water solution (22) in the range from 25% by weight to 40% by weight.

4. The method according to claim 2, wherein the value range corresponds to a concentration of the urea/water solution (22) of 32.5% by weight.

5. The method according to claim 2, wherein assemblies of the motor vehicle are filled with a urea/water solution (22), having a predefined concentration, the known concentration being taken into consideration during the adaptation (34) of the conversion rule.

6. The method according to claim 5, wherein the assemblies include one or more of a pump and a pressure line.

7. The method according to claim 1, wherein the UWS tank (14) of the motor vehicle is filled with a urea/water solution (22), the concentration of the urea/water solution (22) is measured, the measured concentration being taken into consideration during the adaptation (34) of the conversion rule.

8. The method according to claim 7, wherein the value range corresponds to a concentration of the urea/water solution (22) in the range from 25% by weight to 40% by weight.

9. The method according to claim 7, wherein the value range corresponds to a concentration of the urea/water solution (22) of 32.5% by weight.

10. The method according to claim 7, wherein assemblies of the motor vehicle are filled with a urea/water solution (22), the concentration of the urea/water solution (22) is measured, the measured concentration being taken into consideration during the adaptation (34) of the conversion rule.

11. The method according to claim 10, wherein the assemblies include one or more of a pump, and a pressure line.

12. The method according to claim 1, wherein, for the initial calibration, the UWS tank (14) is filled with a urea/water solution (22), the temperature of which corresponds to the ambient temperature of the motor vehicle.

13. The method according to claim 1, wherein, for the initial calibration, a time period (T) is waited after filling of the UWS tank (14) with a urea/water solution (22), which time period (T) ensures a discharge of gas bubbles from the urea/water solution (22) and/or ensures thorough mixing of the urea/water solution (22) and/or ensures mechanical calming of the urea/water solution (22) and/or ensures a temperature equalization of the urea/water solution (22) to the tank and its installed parts.

14. A non-transitory machine-readable storage medium, on which a computer program is stored, the computer program performing the method according to claim 1 when executed.

15. An electronic control unit (19) set up to calibrate a UWS quality sensor (20), which is arranged in a motor vehicle, performing the method according to claim 1.

* * * * *